United States Patent [19]

Tajima et al.

[11] Patent Number: 5,152,936

[45] Date of Patent: Oct. 6, 1992

[54] METHOD OF MANUFACTURING SPHERICAL GRAINS OF RARE EARTH OXIDES

[75] Inventors: Shigenobu Tajima, Kiyose; Masatoshi Ishii, Fukui; Yuji Kimura, Takefu, all of Japan

[73] Assignee: Shin-Etsu Chemical Co., Ltd., Tokyo, Japan

[21] Appl. No.: 730,460

[22] Filed: Jul. 16, 1991

Related U.S. Application Data

[62] Division of Ser. No. 539,064, Jun. 15, 1990, Pat. No. 5,061,560.

[30] Foreign Application Priority Data

Jun. 16, 1989 [JP] Japan .................................. 1-153728

[51] Int. Cl.⁵ .......................... C04B 35/00; B01D 1/16
[52] U.S. Cl. ...................................... 264/13; 159/48.1; 423/263; 501/152
[58] Field of Search ...................... 264/13, 5; 501/152; 423/263; 159/48.1

[56] References Cited

U.S. PATENT DOCUMENTS

| | | | |
|---|---|---|---|
| 4,445,182 | 11/1982 | Enomoto et al. | 501/151 |
| 4,590,090 | 5/1986 | Siemers et al. | 423/263 |
| 4,599,270 | 7/1986 | Rangaswamy et al. | 428/402 |
| 4,649,003 | 3/1987 | Hashimoto et al. | 264/63 |
| 4,671,912 | 6/1987 | Komatsu et al. | 264/63 |
| 4,740,246 | 4/1988 | Feagin | 501/152 |
| 4,787,439 | 11/1988 | Feagin | 428/697 |

FOREIGN PATENT DOCUMENTS

| | | | |
|---|---|---|---|
| 67299/65 | 12/1965 | Australia. | |
| 255353 | 10/1988 | Japan | 428/402 |
| 966945 | 8/1964 | United Kingdom | 264/63 |
| 87/04110 | 7/1987 | World Int. Prop. O. | |

OTHER PUBLICATIONS

Ludwig, "How & Why Solids Agglomerate", Jan. 1954.
Wrich, "Chemical Processing of Ceramics", Jan. 1, 1990, E & EN.
Hoffman, "Importance of Binders in Spray Dried Pressbodies", Ceramic Bulletin, Jun. 26, 1971.
Porovkova, "The Sintering & Properties of $Y_2O_3$ Compounds", Nov. 1970.

Primary Examiner—Mary Lynn Theisen
Attorney, Agent, or Firm—McAulay Fisher Nissen Goldberg & Kiel

[57] ABSTRACT

Inventive rare earth oxide voidless spherical grains having a mean grain diameter of from about 20–300 μm formed by granulating a rare earth oxide powder having a mean grain diameter of 1 μm or less are disclosed. A granulation method is disclosed comprising slurrying a rare earth oxide powder by dispersing it in water, admixing a salt of an organic acid with the slurry, and spray-drying the slurry.

10 Claims, No Drawings

METHOD OF MANUFACTURING SPHERICAL GRAINS OF RARE EARTH OXIDES

This is a division of application Ser. No. 07/539,064, filed June 15, 1990, now U.S. Pat. No. 5,061,560.

BACKGROUND OF THE INVENTION

I. Field of the Invention

The present invention relates to spherical grains of rare earth oxides useful in the manufacture of sintered products of rare earth oxides, and also to a method of manufacturing the spherical grains of rare earth oxides.

II. Description of the Prior Art

Conventionally, spherical grains of rare earth oxides are manufactured by adding water and then an organic or inorganic binder to a powder of the rare earth oxides to form a slurry. The slurry is molded and simultaneously dehydrated by known methods, such as, the slip cast method or the rubber press method. The mold is then dried and baked. Methods of casting reactive metals into ceramic molds are disclosed by Feagin U.S. Pat. Nos. 4,740,246 and 4,787,439. However, the green density (pre-sintering density) of the material is much less than the after-sintering density of the resulting sintered body because the coefficient of contraction is high. This seriously deforms the mold as it is dehydrated. It is thus difficult to obtain high dimensional precision in the resulting sintered body. Furthermore. the deformed sintered body acquires so much residual stress that its impact strength is poor and it has a high tendency to crack and break. As a result, the yield of the sintered body is lowered.

In an attempt to solve these problems, a rare earth oxide powder was granulated to form spherical grains having a relatively large mean grain diameter. A fine powder was added to the granulate to fill in the voids among the spherical grains and thereby attain the closest packing of the green powder, which was then molded and sintered. However, the spherical grains obtained by spray-drying a commercially available rare earth oxide powder having a mean grain diameter of from 3 to 6 μm are generally cavernous, and the thus obtained green powder has a relatively low density.

SUMMARY OF THE INVENTION

We have discovered a method to increase the density of the green powder, i.e., the pre-sintering density, and obtain spherical grains which are packed as closely as possible.

More particularly, we have found that it is possible to obtain "most-closely-packed" (referred to herein as voidless) spherical grains by first preparing a slurry of a rare earth oxide powder having a mean grain diameter of 1 μm or smaller in water, adding an organic acid salt as a binder to the slurry, and then spray-drying the slurry.

The inventive rare earth oxide grains are voidless, spherical and have a mean grain diameter of about 20–300 μm.

DETAILED DESCRIPTION OF THE INVENTION

According to the invention, the mean grain diameter of the rare earth oxide powder must not exceed 1 μm because, if it does, the resulting spherical grains will be cavernous, i.e., have large and/or many voids. Preferably, the mean grain diameter is from 0.8 to 1.0 μm. The rare earth oxide employed in the invention may be an oxide of La, Ce, Pr, Nd. Sm, Eu, Gd, Tb, Dy, Ho, Er, Tm, Yb, Lu, Y, or Sc, or a mixture thereof. The oxides of Y, Gd, and Er are preferred.

When the rare earth oxide powder having a mean grain diameter of 1 μm or smaller is mixed with an appropriate amount of water and the thus-prepared slurry is admixed with an organic acid salt, the slurry will have an increased density and a reduced viscosity. Also, its stability is improved so that the separation of the powder does not take place for a long time.

According to the invention, the salt of the organic acid may be sodium alginate, ammonium alginate, sodium carboxymethyl cellulose, ammonium carboxymethyl cellulose, or a mixture thereof. A preferred dosage of the organic acid salt is from about 0.01 to 1.00 weight part per 100 weight parts of rare earth oxides. A preferred concentration of the rare earth oxides solid in the slurry is from about 30 to 75 weight %. Through the addition of the organic acid salt, it is possible to control the slurry concentration, when the acid salt is added in an amount of from about 0.05 to 1.00 weight part per 100 weight parts of rare earth oxides. Specifically, the slurry concentration can be controlled in the range of from about 70 to 75 weight %, whereas when acid salt is not added, the slurry concentration can only be controlled within the range of less than about 66 weight %.

The slurry is thereafter spray-dried to form voidless spherical grains with a standard spray dryer. The conditions for carrying out the spray drying are conventional. However, if a particular range of mean grain diameter is desired for the resulting grains, the rotational speed of the disk of the spray drier, the feed rate of the slurry, the hot air flow rate, and the hot air temperature should be appropriately adjusted.

The following examples illustrate the invention. In the examples, all of the unit "part(s)" hereinafter employed are weight part(s), respectively.

EXAMPLE 1

As the starting rare earth oxide powder, $Y_2O_3$-SU [the suffix SU indicates a commercial product of Shin-Etsu Chemical Co., Ltd. of Japan], having a mean grain diameter ($D_{50}$) of $\leq 1$ μm, was employed. Water was added to the powder and a slurry having a solid concentration of 55% was obtained. To this slurry was added ammonium carboxymethyl cellulose in an amount of 0.24 parts per 100 parts of $Y_2O_3$-SU. The slurry was then put through a spray drier and was thus granulated. The spray drying conditions were as follows:

slurry feed rate: 2 kg/hr
disk diameter: 55 mm $\phi$
disk speed: 12,000 rpm
hot air temperature: 72° C.
hot air flow rate: 4 m³/min The thus granulated spherical grains had a mean grain diameter of 49.5 μm, and the grain diameter distribution was between 20 and 80 μm. The bulk density of the grains was 1.8 g/cc. The spherical grains were admixed with one part of polyvinyl alcohol [C-17, a commercial product of Shin-Etsu Chemical Co., Ltd.], and the mixture was stirred well and formed into a disk plate of 100 mm diameter, which was then baked at a temperature of 1,700° C. The resulting sintered body had an after-sintering density of 4.9 g/cc, and the coefficient of contraction was 80%.

EXAMPLE 2

With the exception that $Gd_2O_3$-SU was employed as the starting rare earth oxide powder, the same procedure was carried out as in Example 1. The resulting spherical grains had a mean diameter of 44.2 μm and the grain diameter distribution was between 20 and 80 μm. The bulk density was 2.2 g/cc. The spherical grains were sintered in the same manner as in Example 1. The resulting sintered body had an after-sintering density of 7.43 g/cc, and the coefficient of contraction was 78%.

EXAMPLE 3

With the exception that $Er_2O_3$-SU was employed as the starting rare earth oxide powder, the same procedure was used as in Example 1. The resulting spherical grains had a mean diameter of 44.1 μm and the grain diameter distribution was between 20 and 80 μm. The bulk density was 2.2 g/cc. The spherical grains were sintered in the same manner as in Example 1. The resulting sintered body had an after-sintering density of 8.53 g/cc, and the coefficient of contraction was 76%.

COMPARATIVE EXAMPLE

With the exception that a commercial $Y_2O_3$ having a mean diameter of 3.5 μm was used as the starting rare earth oxide powder, and that two parts of polyvinyl alcohol [C-17] per 100 parts of $Y_2O_3$ were mixed in the slurry as the binder, the same granulation method was used as in Example 1. The resulting sintered body was similarly analyzed. The resulting grains had a mean diameter of 41 μm and the grain diameter distribution was between was between 20 and 80 μm. The bulk density was 0.9 g/cc. The grains were not spherical. The grains were admixed with one part of polyvinyl alcohol C-17 and the mixture was stirred well and formed into a disk plate of 100 mm diameter, which was then baked at a temperature of 1,700° C. The resulting sintered body had an after-sintering density of 4.2 g/cc, and the coefficient of contraction was 89%.

According to the results of the above comparison, the resulting grains of the present invention had a more spherical shape and a higher bulk density, namely 1.2 to about 2 g/cc, so that it is presumed they were far less cavernous and more closely packed. A sintered body formed of a mixture of these inventive spherical grains and the conventional rare earth oxides powder will have improved properties, such as, high after-sintering density and higher impact strength.

What is claimed is:

1. A method for manufacturing rare earth oxide voidless spherical grains having a mean grain diameter of from about 20-300 μm comprising the steps of slurrying a rare earth oxide powder having a mean particle diameter of about 1 μm or less by dispersing it in water, admixing a salt of an organic acid in an amount from about 0.01 to 1.00 weight part per 100 weight parts of rare earth oxide with the slurry, and spray-drying the slurry.

2. The method of claim 1 wherein said rare earth oxide powder has a mean particle diameter of about 0.8 to 1.0 μm.

3. The method of claim 1 wherein said rare earth oxide is selected from the group consisting of oxides of La, Ce, Pr, Nd, Sm, Eu, Gd, Tb, Dy, Ho, Er, Tm, Yb, Lu, Y, or Sc, and mixtures thereof.

4. The method of claim 1 wherein said organic acid salt is selected from the group consisting of sodium alginate, ammonium alginate, sodium carboxymethyl cellulose, or ammonium carboxymethyl cellulose, and mixtures thereof.

5. The method of claim 1 wherein the dosage of said salt is from about 0.01 to 1.00 weight part per 100 weight parts of rare earth oxide.

6. The method of claim 1 wherein said rare earth oxide powder is $Y_2O_3$.

7. The method of claim 1 wherein said rare earth oxide powder is $Gd_2O_3$.

8. The method of claim 1 wherein said rare earth oxide powder is $Er_2O_3$.

9. The method of claim 1 wherein said rare earth oxide voidless spherical grains have a mean grain diameter of 20-80 μm.

10. The method of claim 1 wherein said grains have a bulk density from about 1.2 to 2 g/cc.

* * * * *